(12) United States Patent
Sakai (10) Patent No.: US 9,600,906 B2
(45) Date of Patent: Mar. 21, 2017

(54) INFORMATION PROCESSING APPARATUS, INFORMATION PROCESSING METHOD, PROGRAM, AND IMAGE DISPLAY APPARATUS

(71) Applicant: Sony Corporation, Tokyo (JP)

(72) Inventor: Shiun Sakai, Aichi (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 14/457,746

(22) Filed: Aug. 12, 2014

(65) Prior Publication Data

US 2015/0062146 A1 Mar. 5, 2015

(30) Foreign Application Priority Data

Sep. 3, 2013 (JP) ................................. 2013-182624

(51) Int. Cl.
| | |
|---|---|
| *G09G 5/02* | (2006.01) |
| *G09G 5/06* | (2006.01) |
| *G06T 5/00* | (2006.01) |
| *G06T 5/40* | (2006.01) |
| *H04N 1/60* | (2006.01) |
| *H04N 5/202* | (2006.01) |
| *H04N 9/64* | (2006.01) |
| *G06T 11/00* | (2006.01) |

(52) U.S. Cl.
CPC ......... *G06T 11/001* (2013.01); *H04N 1/6061* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,297,826 B1* | 10/2001 | Semba | ................. | H04N 1/6019 345/589 |
| 2006/0126598 A1* | 6/2006 | Lai | ........................ | H04L 67/04 370/352 |
| 2007/0229867 A1* | 10/2007 | Suzuki | ................. | H04N 1/6058 358/1.9 |
| 2008/0123164 A1* | 5/2008 | Suzuki | ................. | H04N 1/6058 358/518 |
| 2008/0137948 A1* | 6/2008 | Tamagawa | ........... | H04N 1/6058 382/167 |
| 2008/0259369 A1* | 10/2008 | Kanai | ................... | G06T 11/001 358/1.9 |
| 2009/0231646 A1* | 9/2009 | Yamauchi | ............ | H04N 1/6058 358/523 |

(Continued)

*Primary Examiner* — Wesner Sajous
(74) *Attorney, Agent, or Firm* — Wolf, Greenfield & Sacks, P.C.

(57) ABSTRACT

An information processing apparatus includes an acquisition unit, a first calculation unit, and a conversion unit. The acquisition unit is configured to acquire image information including first color information that is represented by a first color gamut. The first calculation unit is configured to use information on a color gamut of an image display system that is capable of displaying an image based on the image information to calculate conversion information used for converting the first color information into second color information that is expressed by a second color gamut based on a user's instruction. The conversion unit is configured to use the conversion information to convert the first color information into the second color information.

9 Claims, 9 Drawing Sheets

(56) References Cited

U.S. PATENT DOCUMENTS

| | | | | |
|---|---|---|---|---|
| 2011/0115811 A1* | 5/2011 | Zhang | ..................... | G09G 5/02 |
| | | | | 345/590 |
| 2011/0128438 A1* | 6/2011 | Yamashita | ................ | G06T 1/00 |
| | | | | 348/384.1 |
| 2012/0218572 A1* | 8/2012 | Kishino | ............... | H04N 1/6005 |
| | | | | 358/1.9 |

* cited by examiner

INFORMATION PROCESSING APPARATUS, INFORMATION PROCESSING METHOD, PROGRAM, AND IMAGE DISPLAY APPARATUS

CROSS REFERENCE TO RELATED APPLICATIONS

This application claims the benefit of Japanese Priority Patent Application JP 2013-182624 filed Sep. 3, 2013, the entire contents of which are incorporated herein by reference.

BACKGROUND

The present disclosure relates to an information processing apparatus, an information processing method, a program, and an image display apparatus that adjust an image displayed by a projector or the like.

Many techniques that adjust an image displayed by a projector or the like have been known. For example, Japanese Patent Application Laid-open No. 2010-20199 discloses a technique that allows an image display apparatus to adjust the color of an image to a color desired by a user in image display.

As shown in FIG. 3 of Japanese Patent Application Laid-open No. 2010-20199, on a screen on which an image is displayed, a cursor for selecting a color desired to be adjusted in the displayed image and an adjustment bar for adjusting the saturation, hue, and intensity are displayed. In addition, on the screen, a color gamut expressed by a horseshoe-shaped range based on the XYZ color space defined by the International Commission on Illumination (CIE), and a color gamut of an input image expressed by a triangular-shaped range in the horseshoe-shaped range are displayed.

In the color gamut of an input image, a point is displayed. The point has the same color as that selected with a cursor, and represents a position in the color gamut. When a user operates the adjustment bar, the point in the color gamut is moved in synchronization therewith. By referring to the displayed color gamut of an input image, the user can recognize which direction he/she should move the point to obtain a desired color. Then, by operating the adjustment bar so that the point is moved toward the direction, the user can adjust the image easily and accurately.

SUMMARY

As described above, there is a need for a useful technique to adjust the color of a displayed image.

In view of the circumstances as described above, it is desirable to provide an information processing apparatus, an information processing method, a program, and an image display apparatus that are capable of adjusting the color of an image displayed by an image display system.

According to an embodiment of the present disclosure, there is provided an information processing apparatus including an acquisition unit, a first calculation unit, and a conversion unit.

The acquisition unit is configured to acquire image information including first color information that is represented by a first color gamut;

The first calculation unit is configured to use information on a color gamut of an image display system that is capable of displaying an image based on the image information to calculate conversion information used for converting the first color information into second color information that is expressed by a second color gamut based on a user's instruction.

The conversion unit is configured to use the conversion information to convert the first color information into the second color information.

In the information processing apparatus, the information on a color gamut of the image display system is used to calculate the conversion information for converting the color information. With the conversion information, the first color information is converted into the second color information expressed by the second color gamut based on a user's instruction. Accordingly, the user can adjust the color of a displayed image by setting the second color gamut appropriately.

The information processing apparatus may further include an input unit. In this case, the second color gamut may be set based on an instruction about chromaticity coordinates of red, green, and blue, which define the second color gamut in a CIE 1931 XYZ color space chromaticity diagram, the instruction being input to the input unit.

Accordingly, it is possible to appropriately set the second color gamut by input an instruction related to chromaticity coordinates of red, green, and blue via the input unit.

The second color gamut may be set based on an instruction that changes the chromaticity coordinates of red, green, and blue.

As described above, based on an instruction that changes the chromaticity coordinates of red, green, and blue, the second color gamut may be set. Accordingly, it is possible to set the second color gamut appropriately.

The second color gamut may be set based on an instruction that designates the chromaticity coordinates of red, green, and blue.

As described above, the chromaticity coordinates of red, green, and blue may be directly designated. Accordingly, it is possible to set the second color gamut appropriately.

The information processing apparatus may further include a storage unit and a second calculation unit.

The storage unit is configured to store information on a color gamut for calculating the information on the color gamut of the image display system. The second calculation unit is configured to use the stored information on a color gamut to calculate the information on the color gamut of the image display system. In this case, the first calculation unit may be configured to use the calculated information on the color gamut of the image display system to calculate the conversion information.

In the information processing apparatus, information on a color gamut for calculating the information on the color gamut of the image display system is stored. When the conversion information is calculated, the information on the color gamut of the image display system calculated based on the information on a color gamut is used.

The storage unit may be configured to store setting change information for converting the first color information into third color information that is expressed by a third color gamut serving as a color gamut set in advance, the setting change information being calculated using the information on the color gamut of the image display system in advance. In this case, the second calculation unit may be configured to use the setting change information as information on the color gamut to calculate the information on the color gamut of the image display system.

In the information processing apparatus, the setting change information being calculated using the information on the color gamut of the image display system in advance is stored. The setting change information is information for converting the first color information into the third color information. The setting change information is used as the above-mentioned information on a color gamut and is calculated back, thereby calculating the information on the color gamut of the image display system. Accordingly, it is possible to reduce the amount of stored information.

The information processing apparatus may further include a storage unit configured to store the information on the color gamut of the image display system, which is measured in advance. In this case, the first calculation unit may be configured to use the stored information on the color gamut of the image display system to calculate the conversion information.

As described above, the information on the color gamut of the image display system may be stored, and the stored information on the color gamut of the image display system may be used, thereby calculating the conversion information. Accordingly, it is possible to reduce the calculation amount.

The second color gamut may be set based on an instruction that selects chromaticity coordinates outside of the color gamut of the image display system as at least one of the chromaticity coordinates of red, green, and blue.

As described above, chromaticity coordinates outside of the color gamut of the image display system may be selected as the chromaticity coordinates of red, green, and blue. As described above, by setting the second color gamut, it is possible to adjust the color of a displayed image.

According to an embodiment of the present disclosure, there is provided an information processing method executed by a computer including acquiring image information including first color information that is represented by a first color gamut.

Information on a color gamut of an image display system that is capable of displaying an image based on the image information is used to calculate conversion information used for converting the first color information into second color information that is expressed by a second color gamut based on a user's instruction.

The conversion information is used to convert the first color information into the second color information.

According to an embodiment of the present disclosure, there is provided a program that causes a computer to execute the steps of acquiring image information including first color information that is represented by a first color gamut, using information on a color gamut of an image display system that is capable of displaying an image based on the image information to calculate conversion information used for converting the first color information into second color information that is expressed by a second color gamut based on a user's instruction, and using the conversion information to convert the first color information into the second color information.

According to an embodiment of the present disclosure, there is provided an image display apparatus including an acquisition unit, an image display system, a first calculation unit, a conversion unit, and an output unit.

The acquisition unit is configured to acquire image information including first color information that is represented by a first color gamut.

The image display system is capable of displaying an image based on the image information.

The first calculation unit is configured to use information on a color gamut of the image display system to calculate conversion information used for converting the first color information into second color information that is expressed by a second color gamut based on a user's instruction.

The conversion unit is configured to use the conversion information to convert the first color information into the second color information.

The output unit is configured to output the second color information to the image display system.

As described above, according to the present disclosure, it is possible to provide an information processing apparatus, an information processing method, a program, and an image display apparatus that are capable of adjusting the color of an image displayed by an image display system. It should be noted that the effects described above are not necessarily restrictive, and may be any of those described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments according to the present disclosure will be described with reference to the drawings.
(Configuration of Image Display Apparatus)

Figure 1:
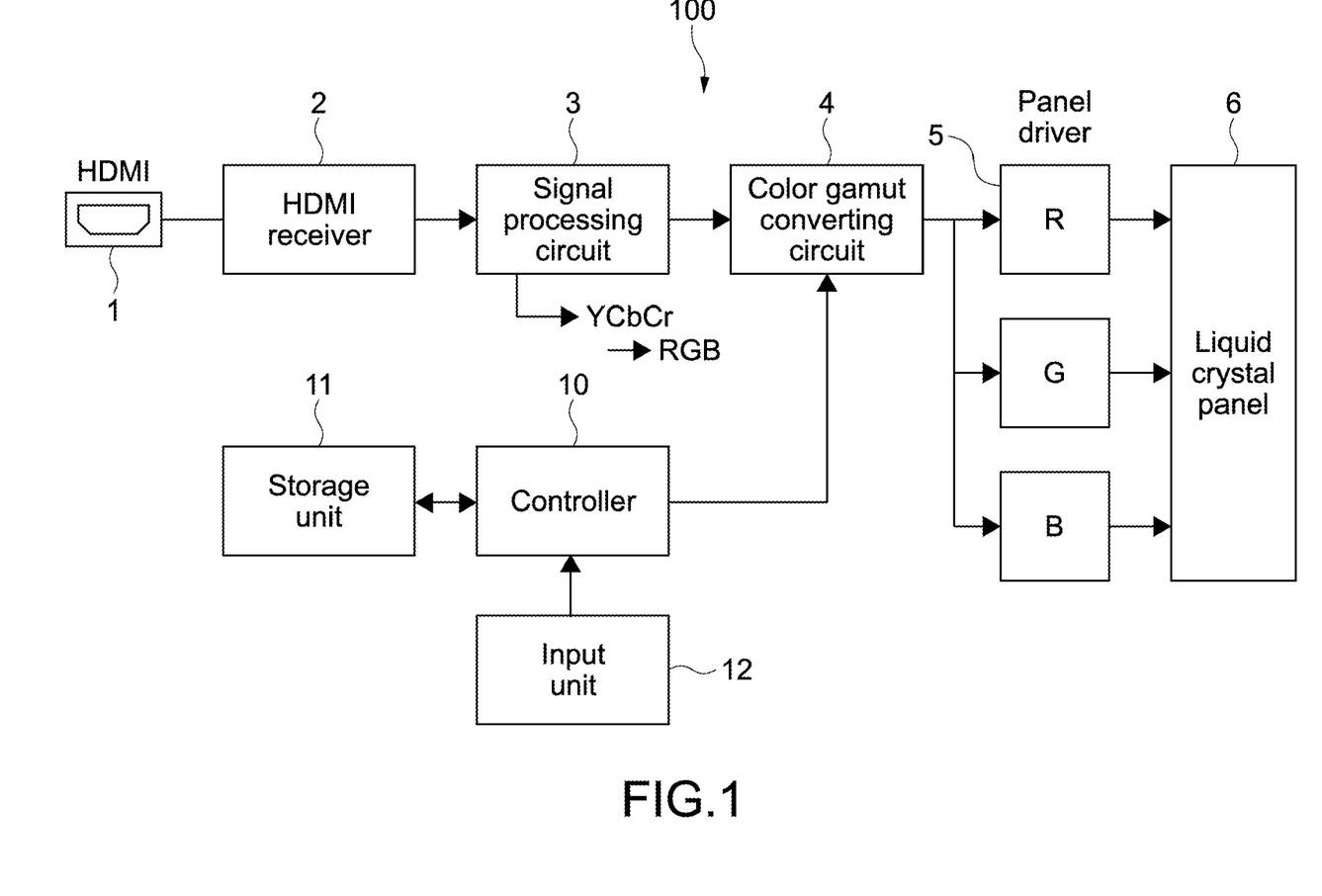
FIG. 1 is a schematic diagram showing a configuration example of an image display apparatus according to an embodiment of the present disclosure.

FIG. 1 is a schematic diagram showing a configuration example of a display system in an image display apparatus according to an embodiment of the present disclosure. An image display apparatus 100 is used as a projector for presentation or digital cinema. Embodiments of the present disclosure described below can be applied also to an image display apparatus such as a TV receiver and a monitor apparatus used for other uses.

The image display apparatus 100 includes a high definition multimedia interface (HDMI) terminal 1, an HDMI receiver 2, a signal processing circuit 3, a color gamut converting circuit 4 (conversion unit), panel drivers 5 for RGB colors, and a liquid crystal panel 6 for RGB colors. In addition, the image display apparatus 100 includes a controller 10, a storage unit 11, and an input unit 12.

The HDMI terminal 1 is a terminal for inputting a signal in the HDMI format. In this embodiment, an image signal is input via the HDMI terminal 1. The image signal corresponds to image information including color information. It should be noted that another input terminal such as a composite terminal and a D terminal may be provided.

The image information includes first color information expressed by a first color gamut. For example, color information expressed by a color gamut during capturing an image corresponds to the color information expressed by the first color gamut. Examples of the color gamut during capturing an image include, but not limited to, color gamuts of standard RGB (sRGB), Adobe (registered trademark) RGB, digital cinema initiatives (DCI) standards.

In addition, the term "color gamut" represents a portion of a color space, which can be expressed or reproduced by a device or in processing, and are referred to also as a color reproduction range, a color reproducible range, or a color space.

The HDMI receiver 2 receives an image signal or the like input via the HDMI terminal 1, and output it to the signal processing circuit 3. The signal processing circuit 3 converts YCrCb signal serving as color information included in an image signal in the HDMI format into an RGB signal. In this embodiment, the HDMI terminal 1, the HDMI receiver 2, and the signal processing circuit 3 constitute an acquisition unit.

The color gamut converting circuit 4 converts input color information into color information expressed by a predetermined color gamut. For example, in the case where there is a difference between the color gamut of a device that inputs image information and the color gamut of a device that outputs image information, there is a need to correct the difference between the color gamuts to display an image properly. Also in the case where an image is displayed in a color gamut desired by a user, the conversion of a color gamut is performed. Such a technique is referred to as color gamut conversion or color gamut compression/expansion, and the color gamut converting circuit 4 performs the process.

In this embodiment, the color gamut converting circuit 4 converts the first color information expressed by the first color gamut into second color information expressed by a second color gamut based on a user's instruction. In addition, the color gamut converting circuit 4 converts the first color information expressed by the first color gamut into third color information expressed by a third color gamut serving as a color gamut set in advance.

Examples of the third color gamut set in advance include the above-mentioned color gamuts of sRGB, Adobe RGB, and DCI standards. It goes without saying that another color gamut may be set as the third color gamut. The second color gamut based on a user's instruction represents a color gamut set in response to an instruction input to the input unit 12 shown in FIG. 1. For example, the third color gamut set in advance is adjusted in response to the instruction input to the input unit 12, and is set as the second color gamut. Alternatively, a color gamut desired by a user is newly set as the second color gamut. The setting of the second color gamut will be described later in detail.

The panel driver 5 outputs a drive signal for driving the liquid crystal panel 6 for RGB colors based on image information including color information output from the color gamut converting circuit 4. The liquid crystal panel 6 generates an image based on the drive signal output from the panel driver 5. The generated image is projected on a screen by a projection system (not shown), for example.

In this embodiment, the panel driver 5 and the liquid crystal panel 6 each correspond to an image display system that can display an image based on image information. The configuration of the image display system is not limited. For example, three liquid crystal panels for RGB colors may be used, or a single liquid crystal panel may display a color image. Furthermore, instead of the liquid crystal panel, a digital micromirror device (DMD) or the like may be used.

The controller 10 is capable of controlling each mechanism in the image display apparatus 100. The controller 10 includes a central processing unit (CPU), a random access memory (RAM), a read-only memory (ROM), and the like. The CPU loads a controlling program stored in the ROM in advance into the RAM, and executes the program, thereby controlling each mechanism. The configuration of the controller 10 is not limited, and any hardware and software may be used. For example, a programmable logic device (PLD) such as a field programmable gate array (FPGA), or a device such as an application specific integrated circuit (ASIC) may be used.

The storage unit 11 is a non-volatile storage device. As the storage unit 11, a hard disk drive (HDD), a flash memory, or another solid-state memory is used, for example. The above-mentioned ROM or the like in the controller 10 may operate as the storage unit 11.

The input unit 12 is a controller, a pointing device, a keyboard, a touch panel, or another operating device, for example. In the case where the input unit 12 includes a touch panel, the touch panel may be integrated with a GUI display unit that displays various graphical user interfaces (GUIs). It should be noted that the image display system may be used as the GUI display unit, or a GUI display unit may be provided separately from the image display system. A user's instruction is input to the input unit 12, and a command signal corresponding thereto is input to the controller 10 or the like.

Figure 2:
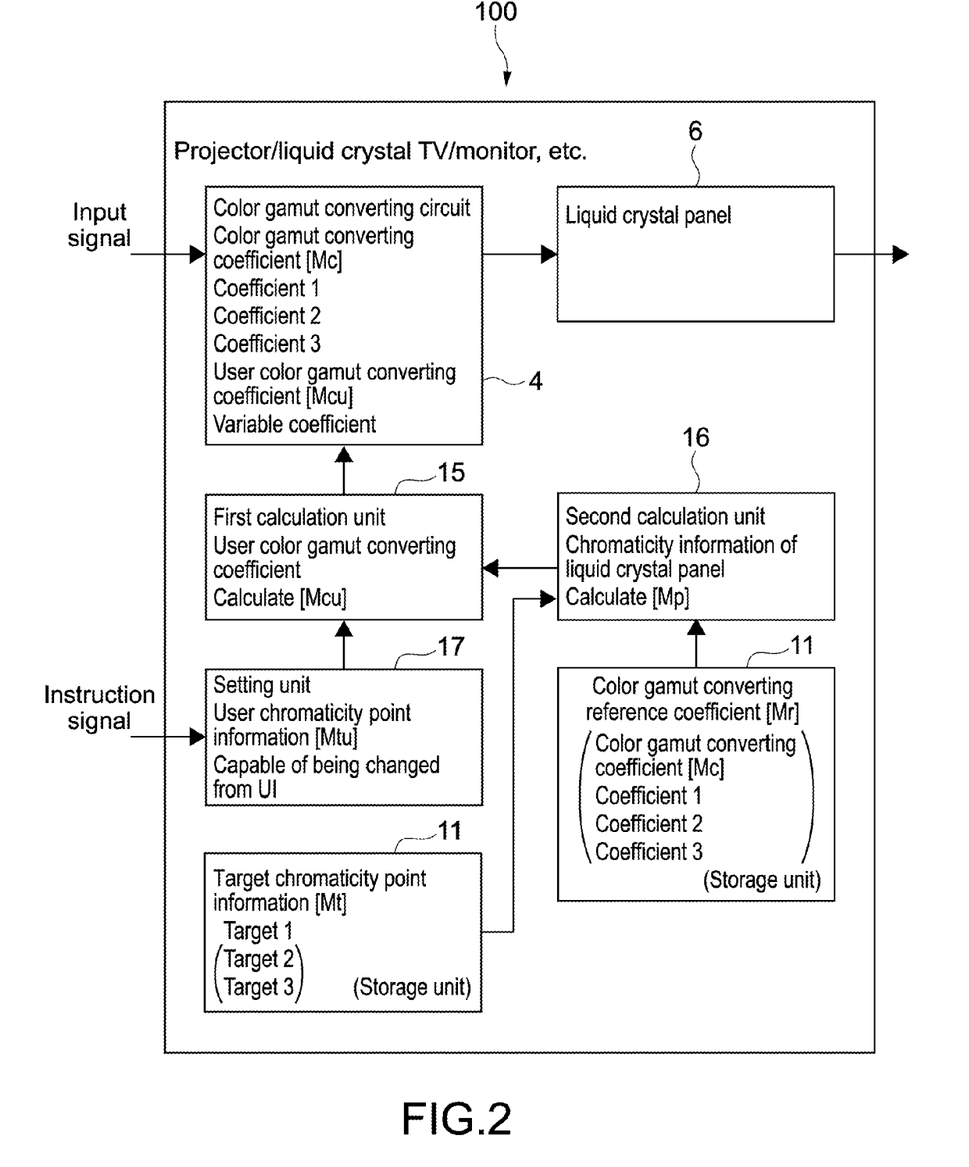
FIG. 2 is a schematic diagram showing a configuration example related to color gamut conversion of the image display apparatus.

FIG. 2 is a schematic diagram showing a configuration example related to color gamut conversion of the image display apparatus 100. The image display apparatus 100 includes the color gamut converting circuit 4, the liquid crystal panel 6, a first calculation unit 15, a second calculation unit 16, and a setting unit 17. The CPU in the controller 10 executes a predetermined program, thereby realizing the first calculation unit 15, the second calculation unit 16, and the setting unit 17. Specifically, the information processing according to this embodiment is realized by cooperation of software such as a program stored in the storage unit 11 or the like and a hardware resource of the image display apparatus 100 such as a CPU and various types of circuits.

The program is installed in the image display apparatus 100 via a recording medium, for example. Alternatively, the program may be installed in the image display apparatus 100 through the Internet or the like. In addition, the program may be processed in time series, or processed in parallel or at a necessary timing, for example, when a call is made.

The color gamut converting circuit 4 converts the first color information into the third color information using the following formula 1 with a color gamut converting coefficient Mc.

[Math. 1]

$$(Mc)\begin{pmatrix} R \\ G \\ B \end{pmatrix} = \begin{pmatrix} R' \\ G' \\ B' \end{pmatrix} \quad (1)$$

In addition, the color gamut converting circuit 4 converts the first color information into the second color information using the following formula 2 with a user color gamut converting coefficient Mcu.

[Math. 2]

$$(Mcu)\begin{pmatrix} R \\ G \\ B \end{pmatrix} = \begin{pmatrix} R' \\ G' \\ B' \end{pmatrix} \quad (2)$$

These conversion coefficients are expressed by a 3*3 matrix. In order to perform conversion into the third color information that is expressed by the third color gamut set in advance, the color gamut converting coefficient Mc is calculated in advance and is stored in the storage unit 11. The color gamut converting coefficient Mc corresponds to the setting change information in this embodiment. On the other hand, the user color gamut converting coefficient Mcu is calculated based on a user's instruction. The user color gamut converting coefficient Mcu corresponds to the conversion information in this embodiment.

Figure 3:
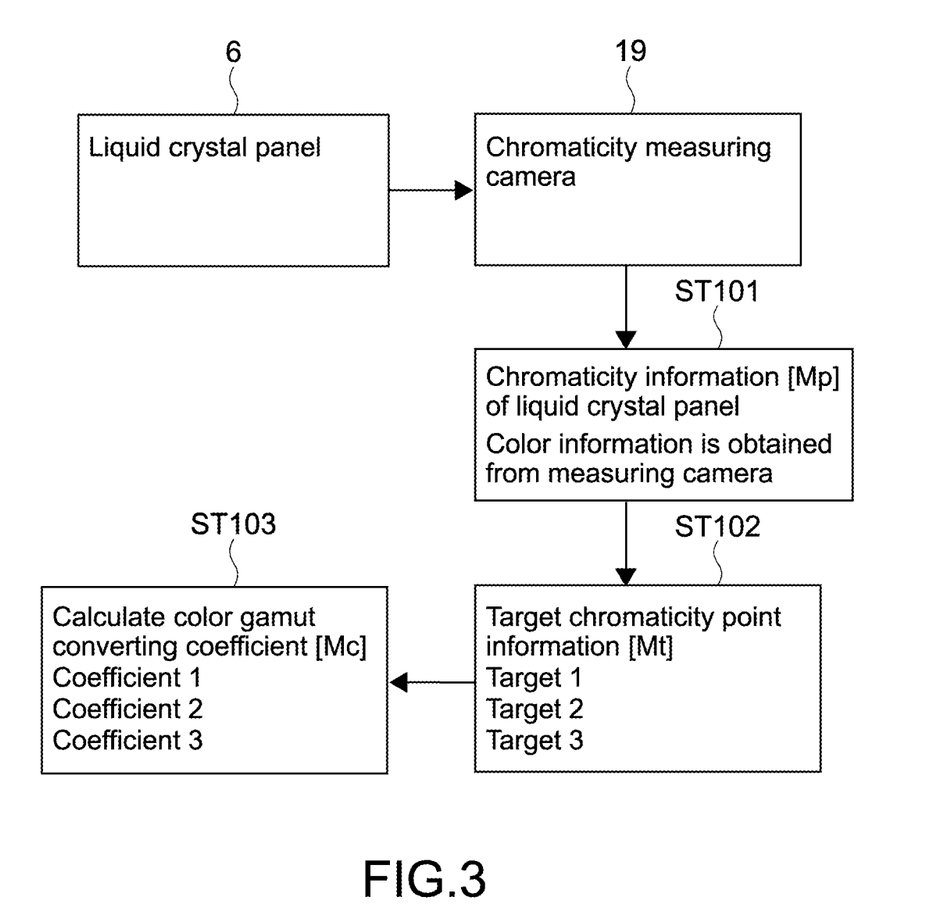
FIG. 3 is a diagram for explaining a method of calculating a color gamut converting coefficient.
Figure 4:
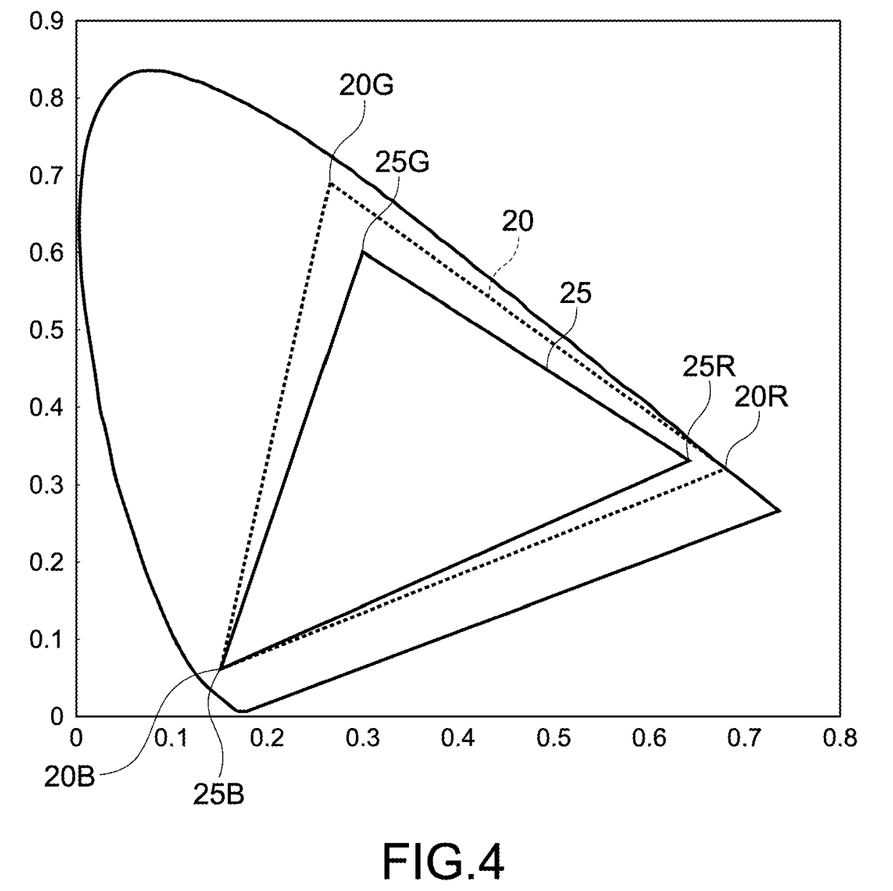
FIG. 4 is an xy chromaticity diagram for explaining the method of calculating a color gamut converting coefficient.

FIG. 3 is a diagram for explaining a method of calculating the color gamut converting coefficient Mc. FIG. 4 is a chromaticity diagram of the XYZ color space (xy chromaticity diagram) for explaining the method of calculating the color gamut converting coefficient Mc. As shown in FIG. 3, chromaticity information MP of the liquid crystal panel 6 is measured during adjustment performed in a factory or sensor calibration, for example.

To achieve this, the liquid crystal panel 6 displays colors of RGB and a chromaticity measuring camera 19 measures the RGB value. Another device for measuring the RGB value may be used.

As shown in FIG. 3, the measurement values of RGB are converted into values of the XYZ color space. As shown in FIG. 4, based on the converted values of the XYZ color space, the chromaticity information Mp of the liquid crystal panel 6 is obtained (Step 101 of FIG. 3).

[Math. 3]

$$\begin{aligned} \text{Measurement value of } R &= Xr, Yr, Zr \\ \text{Measurement value of } G &= Xg, Yg, Zg \\ \text{Measurement value of } B &= Xb, Yb, Zb \end{aligned} \quad (3)$$

$$Mtx \text{ of panel} = (Mp) = \begin{pmatrix} Xr & Xg & Xb \\ Yr & Yg & Yb \\ Zr & Zg & Zb \end{pmatrix} \quad (4)$$

In this embodiment, the chromaticity information Mp of the liquid crystal panel 6 corresponds to the information on the color gamut of the image display system. In the xy chromaticity diagram of FIG. 4, a triangle drawn in dashed lines is a color gamut 20 corresponding to the chromaticity information Mp of the liquid crystal panel 6. The color gamut 20 represents a color range that can be reproduced (expressed) by the liquid crystal panel 6. The X, Y, and Z values of RGB shown in the formula 3 correspond to values of chromaticity coordinates at vertices 20R, 20G, and 20B of RGB being three primary colors of the color gamut 20, respectively (values themselves of chromaticity coordinates being values of the XYZ color space).

In this embodiment, three types of color gamuts are prepared as the third color gamut set in advance. Target chromaticity point information Mt related to these color gamuts is obtained (Step 102). The target chromaticity point information Mt is set in advance by the standards or the like, and includes information on chromaticity coordinates at three vertices that define a color gamut. In the example shown in FIG. 4, for example, a color gamut 25 of sRGB is shown, and the values of chromaticity coordinates at vertices 25R, 25G, and 25B are defined. Such a color gamut is expressed by XYZ values of the XYZ color space, and is obtained as the target chromaticity point information Mt.

Based on the chromaticity information Mp of the liquid crystal panel 6 and the target chromaticity point information Mt, the color gamut converting coefficient Mc is calculated as shown in the following formula 5 (Step 103).

[Math. 4]

$$(Mc) = (Mp)^{-1}(Mt) \quad (5)$$

The color gamut converting coefficient Mc is also a correction value for expressing the color in the third color gamut by the liquid crystal panel 6 to be used. In this embodiment, three color gamut converting coefficients Mc (coefficient 1, coefficient 2, and coefficient 3) depending on three types of target chromaticity point information Mt (target 1, target 2, and target 3) are calculated, respectively. As shown in FIG. 2, the three types of color gamut converting coefficients Mc are stored in the storage unit 11. Then, the color gamut converting coefficients Mc are read appropriately during the color gamut converting process shown in the formula 1. In addition, in this embodiment, at least one of the three types of target chromaticity point information Mt is stored in the storage unit 11.

The setting unit 17 sets the second color gamut based on an instruction input to the UI (input unit). Then, user chromaticity point information Mtu that targets the set second color gamut is generated. The user chromaticity point information Mtu can be changed by a user's instruction.

The second calculation unit 16 uses a color gamut converting reference coefficient Mr stored in the storage unit 11 to calculate the chromaticity information Mp of the liquid crystal panel 6. In this embodiment, the color gamut converting reference coefficient Mr corresponds to information on a color gamut for calculating the chromaticity information Mp of the liquid crystal panel 6. In this embodiment, as shown in FIG. 2, the color gamut converting coefficient Mc that is calculated and stored in advance is used as the color gamut converting reference coefficient Mr.

The first calculation unit 15 uses the chromaticity information Mp of the liquid crystal panel 6 to calculate the user color gamut converting coefficient Mcu for converting the first color information into the second color information expressed by the second color gamut based on a user's instruction. Hereinafter, the operation of each block will be described in detail.

(Operation of Image Display Apparatus)

Figure 5:
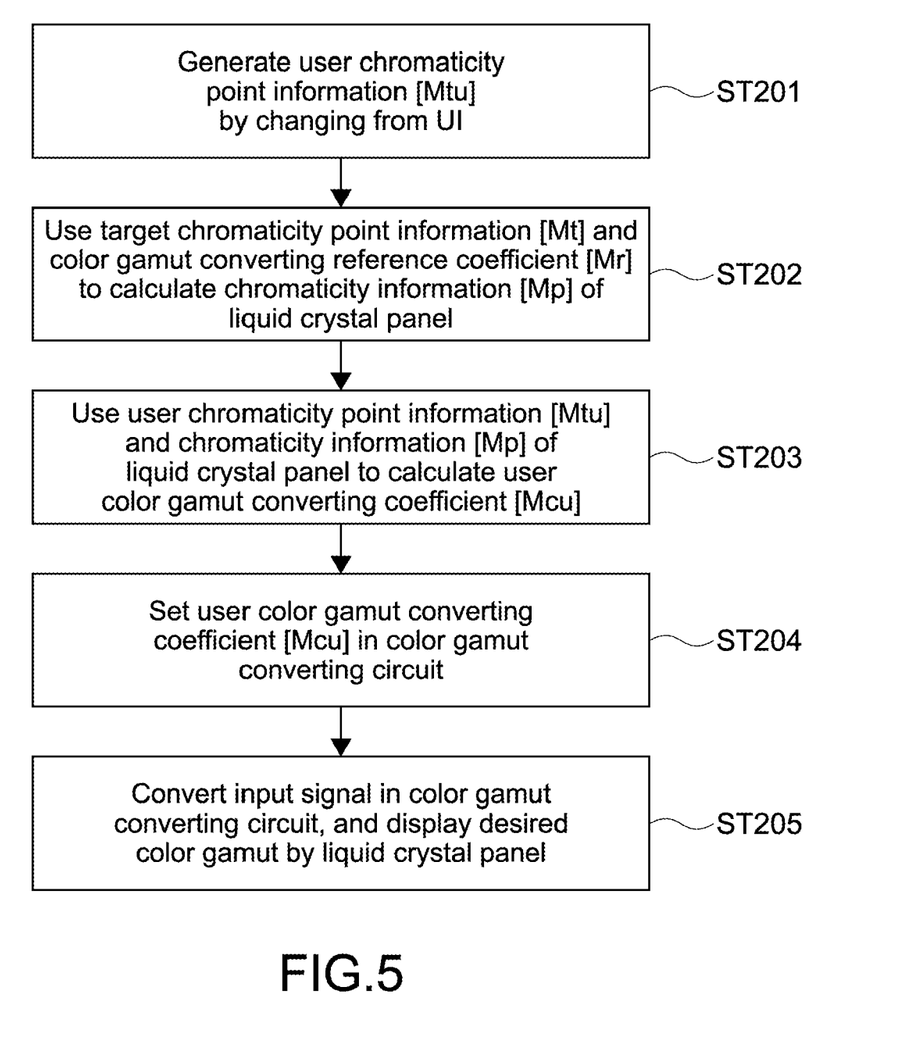
FIG. 5 is a flowchart showing an operation example of the image display apparatus according to this embodiment.

FIG. 5 is a flowchart showing an operation example of the image display apparatus 100 according to this embodiment. FIGS. 6 to 9 are each a diagram for explaining the operation. First, the setting unit 17 sets the second color gamut based on a user's instruction, and the user chromaticity point information Mtu depending thereon is generated (Step 201).

Figure 6:
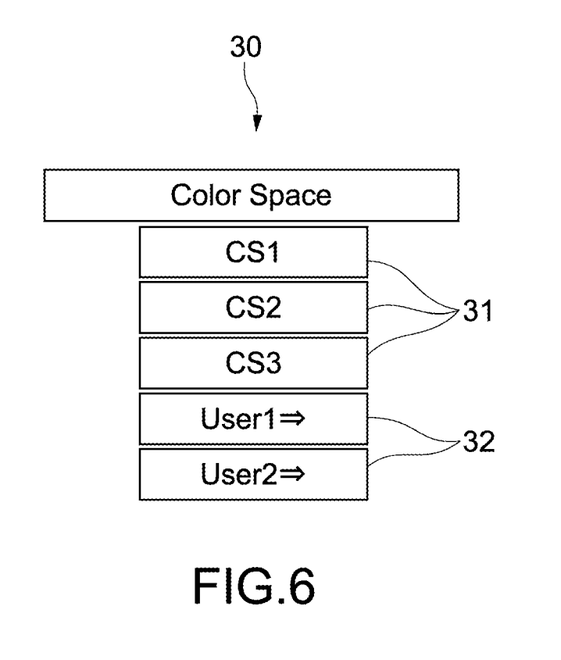
FIG. 6 is a diagram showing an example of a graphical user interface (GUI) for selecting a color gamut (color space)

A GUI 30 for selecting a color gamut (color space) shown in FIG. 6 is displayed on a GUI display unit (or liquid crystal panel 6), for example. Icons 31 (Cs1 to Cs3) represent the three color gamut set in advance such as sRGB. In the case where the icons 31 are selected, the color gamut converting coefficient Mc stored in the storage unit 11 is read appropriately, and the color gamut converting process shown in the formula 1 is performed.

Icons 32 (user 1 and user 2) represent the second color gamuts set by a user's instruction. In the case where the icons 32 are selected, the process shown in the flowchart of FIG. 5 is started. It should be noted that the configuration of the GUI 30 for selecting a color gamut is not limited. Moreover, in the example shown in FIG. 6, although two types of second color gamuts can be set, the number of types is not limited.

Figure 7:
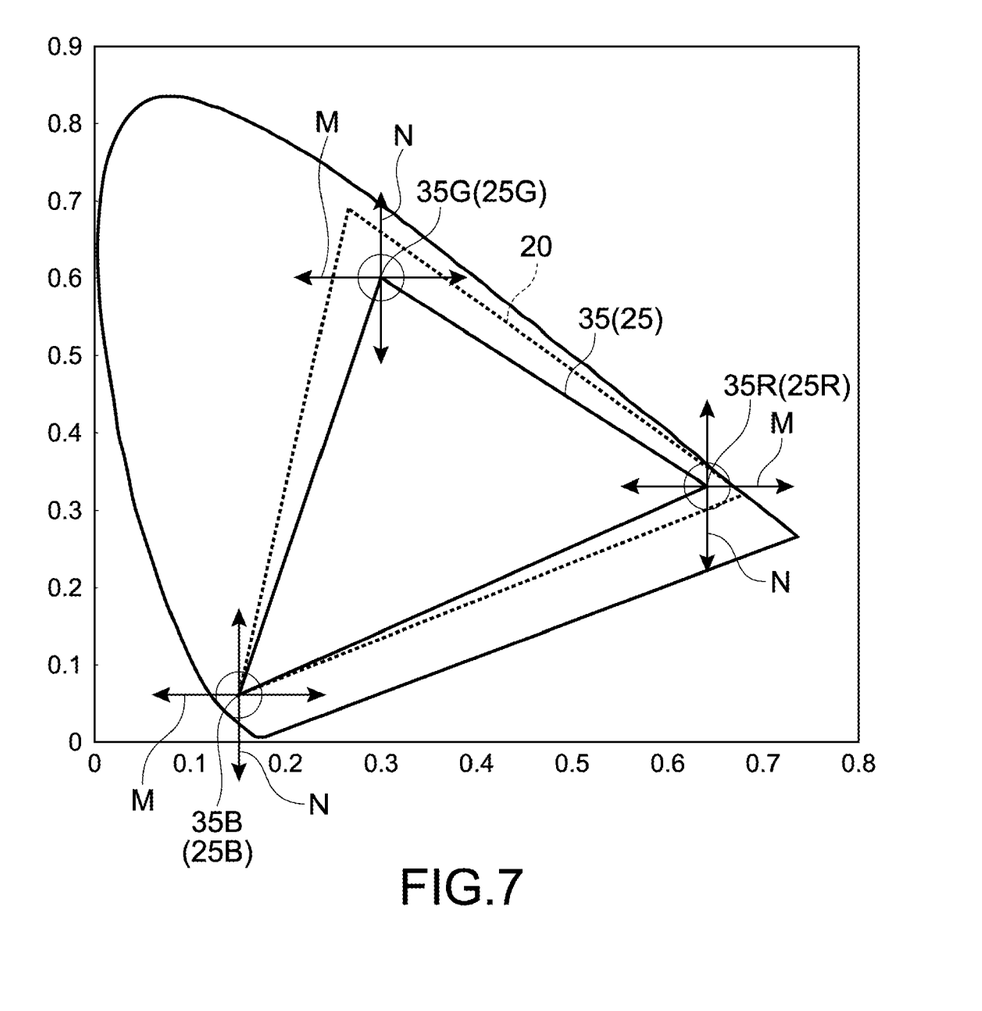
FIG. 7 is an xy chromaticity diagram for explaining setting of a second color gamut.

As shown in FIG. 7, in this embodiment, an instruction related to chromaticity coordinates of red, green, and blue, which define a second color gamut 35 in the xy chromaticity diagram of the XYZ color space, is input. Specifically, chromaticity coordinates at vertices 35R, 35G, and 35B of RGB shown in FIG. 7 are instructed appropriately, thereby setting the second color gamut 35.

Figure 8:
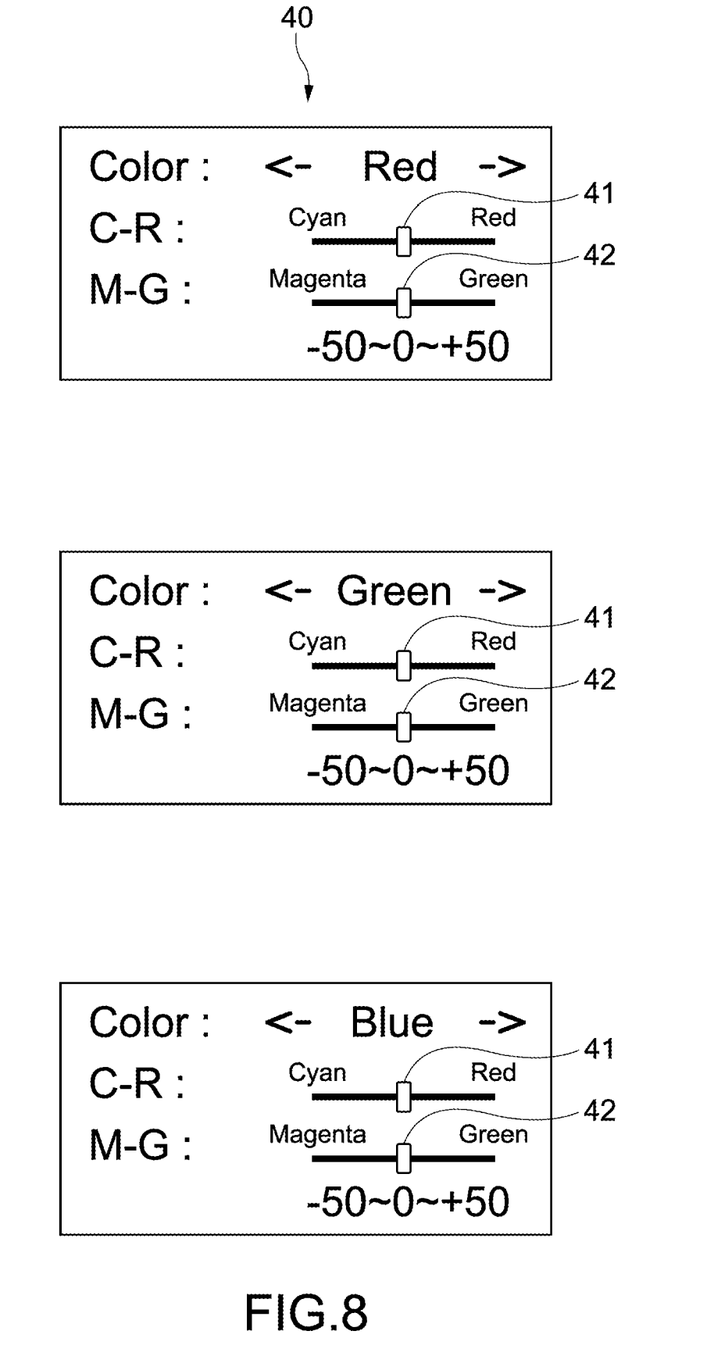
FIG. 8 is a diagram showing an example of a GUI for instructing chromaticity coordinates at each vertex of RGB.

FIG. 8 is a diagram showing an example of a GUI 40 for instructing chromaticity coordinates at the vertices 35R, 35G, and 35B of RGB. For example, for the vertices 35R, 35G, and 35B of RGB, reference chromaticity coordinates and a predetermined range that can be selected are defined. In the xy chromaticity diagram shown in FIG. 7, the predetermined range that can be selected is set by horizontal directions shown by arrows M and vertical directions shown by arrows N.

In the GUI 40 shown in FIG. 8, the horizontal direction shown by the arrow M is set as a cyan-red direction. Then, by moving a C-R operating icon 41, it is possible to instruct the change of chromaticity coordinates in this direction. In addition, the vertical direction shown by the arrow N is set as a magenta-green direction. Then, by moving an M-G operating icon 42, it is possible to instruct the change of chromaticity coordinates in this direction. It should be noted that as shown in FIG. 8, three GUIs may be displayed, or one GUI may be switched for each color and displayed.

The reference chromaticity coordinates and the size of the predetermined range (size of movable range of chromaticity coordinates) may be set appropriately. For example, the reference chromaticity coordinates and the size of the predetermined range may be set in the range that is generally recognized as red, blue, and green. Furthermore, as shown in FIG. 8, as values that represent a movable range (−50 to 0 to +50), not a value of chromaticity coordinates but a gain value may be used.

The xy chromaticity diagram shown in FIG. 7 may be displayed as a GUI 45 for instructing chromaticity coordinates at the vertices 35R, 35G, and 35B of RGB. In this case, a user can set the second color gamut 35 by directly changing three points represented by the reference chromaticity coordinates. Accordingly, it is possible to set the second color gamut 35 while visually confirming the triangular shape. Therefore, it is possible to perform an intuitive operation.

It should be noted that as the reference chromaticity coordinates at the vertices 35R, 35G, and 35B of RGB, chromaticity coordinates at vertices of the third color gamut set in advance may be used. For example, the assumption is made that a color gamut of sRGB is set as the third color gamut. When a user sets the second color gamut 35, the color gamut of sRGB is displayed as a reference color gamut (color gamut 25 of FIG. 7). The user sets the second color gamut 35 by adjusting chromaticity coordinates at the vertices 25R, 25G, and 25B of sRGB. Accordingly, it is possible to set the second color gamut 35 while comparing it with the shape of the third color gamut set in advance or the like. It should be noted that in the case where the third color gamut is selected as a reference color gamut, theoretical values may be selected as values of chromaticity coordinates at each vertex of the third color gamut, or a value of a color gamut that is actually expressed by the liquid crystal panel 6 may be selected. For example, the value of the third color gamut calculated using the color gamut converting coefficient Mc stored in advance is deviated from a theoretical value due to time degradation after product shipment or the like in some cases. These values may be used as values of reference chromaticity coordinates.

It should be noted that a process for correcting the value of the third color gamut to be actually expressed to a theoretical value may be performed in the setting of the second color gamut. Specifically, the setting of the second color gamut may be performed for correcting the third color gamut or may be performed for setting a new color gamut that is desired by a user. It goes without saying that it is not limited thereto.

Instead of the instruction to change the reference chromaticity coordinates of vertices of a color gamut, an instruction to designate chromaticity coordinates of red, green, and blue may be input. For example, values of the chromaticity coordinates of the vertices 35R, 35G, and 35B of RGB may be directly input via the input unit 12. Alternatively, the xy chromaticity diagram shown in FIG. 7 may be displayed as the GUI 45, and points therein may be directly selected as the vertices 35R, 35G, and 35B of RGB. Accordingly, a user can set the desired second color gamut intuitively. Even in the case where chromaticity coordinates of red, green, and blue are selected by changing or by a designation, it is possible to set the second color gamut easily.

In Step 201 shown in FIG. 5, the set second color gamut 35 is expressed by an XYZ value of the XYZ color space, thereby generating the user chromaticity point information Mtu. It should be noted that the method of generating the user chromaticity point information Mtu or the target chromaticity point information Mt is not limited. For example, a method of using no conversion of coordinate values of a color space may be performed.

Next, the color gamut converting reference coefficient Mr stored in the storage unit 11 is used to calculate the chromaticity information Mp of the liquid crystal panel 6 (Step 202). In this embodiment, the color gamut converting coefficient Mc for converting the first color information into the third color information and the target chromaticity point information Mt corresponding to the color gamut converting coefficient Mc are used. The target chromaticity point information Mt corresponding to the color gamut converting coefficient Mc is information used when the color gamut converting coefficient Mc is calculated during adjustment performed in a factory (see FIG. 3). As shown in the following formula 6, the chromaticity information Mp of the liquid crystal panel 6 is calculated.

[Math. 5]

$$(Mp) = (Mt)(Mc)^{-1} \qquad (6)$$

Specifically, in this embodiment, the color gamut converting coefficient Mc is used as the color gamut converting reference coefficient Mr to calculate back the formula 5, thereby calculating the chromaticity information Mp of the liquid crystal panel 6. Any one of the three types of color gamut converting coefficients Mc shown in FIG. 2 only needs to be used as the color gamut converting reference coefficient Mr. Then, information out of the three type of target chromaticity point information Mt, which corresponds to the color gamut converting coefficient Mc, only needs to be stored in the storage unit 11. All or a part of the three types of color gamut converting coefficients Mc may be used as the color gamut converting reference coefficient Mr, and the target chromaticity point information Mt corresponding thereto may be stored in the storage unit 11.

By employing the color gamut converting coefficient Mc used in a color gamut converting process as the color gamut converting reference coefficient Mr as in this embodiment, it is possible to reduce the amount of information stored in the storage unit 11. On the other hand, information other than the color gamut converting coefficient Mc may be used as the color gamut converting reference coefficient Mr. For example, information that is calculated using the chromaticity information Mp of the liquid crystal panel 6, from which the chromaticity information Mp of the liquid crystal panel 6 can be calculated by back calculation, may be prepared appropriately and stored in the storage unit 11.

Based on the user chromaticity point information Mtu calculated in Step 201 and the chromaticity information Mp of the liquid crystal panel 6 calculated in Step 202, the user color gamut converting coefficient Mcu is calculated by the following formula 7 (Step 203).

[Math. 6]

$$(Mcu) = (Mp)^{-1}(Mtu) \qquad (7)$$

The calculated user color gamut converting coefficient Mcu is set in the color gamut converting circuit 4 (Step 204). The calculated the user color gamut converting coefficient Mcu is used to perform the color gamut converting process shown by the formula 2. Then, the first color information is converted into the second color information expressed by the second color gamut 35 based on a user's instruction. Specifically, an input signal is converted in the color gamut converting circuit 4, and a color gamut desired by a user is displayed by the liquid crystal panel 6 (Step 205).

In the image display apparatus 100 according to this embodiment, the chromaticity information Mp of the liquid crystal panel 6 is used to calculate the user color gamut converting coefficient Mcu for converting color information. With the user color gamut converting coefficient Mcu, the first color information is converted into the second color information expressed by the second color gamut 35 based on a user's instruction. Accordingly, the user can set the second color gamut freely, and adjust the color of a displayed image.

(Other Embodiments)

The present disclosure is not limited to the above-mentioned embodiments, and can achieve other various embodiments.

In the above-mentioned embodiments, as shown in Step 202 of FIG. 5, the chromaticity information Mp of the liquid crystal panel 6 is calculated based on the color gamut converting reference coefficient Mr. Instead of this, the chromaticity information Mp of the liquid crystal panel 6 measured in advance during adjustment performed in a factory, for example, may be stored in the storage unit 11 as it is. Then, the first calculation unit 15 may use the chromaticity information Mp of the liquid crystal panel 6 stored in the storage unit 11 to calculate the user color gamut converting coefficient Mcu. Accordingly, the second calculation unit 16 shown in FIG. 2 and Step 102 shown in FIG. 5 can be omitted, and it is possible to reduce the calculation amount. In addition, it does not need to store the color gamut converting reference coefficient Mr or the target chromaticity point information Mt, which is information for calculating the chromaticity information Mp of the liquid crystal panel 6.

Figure 9:
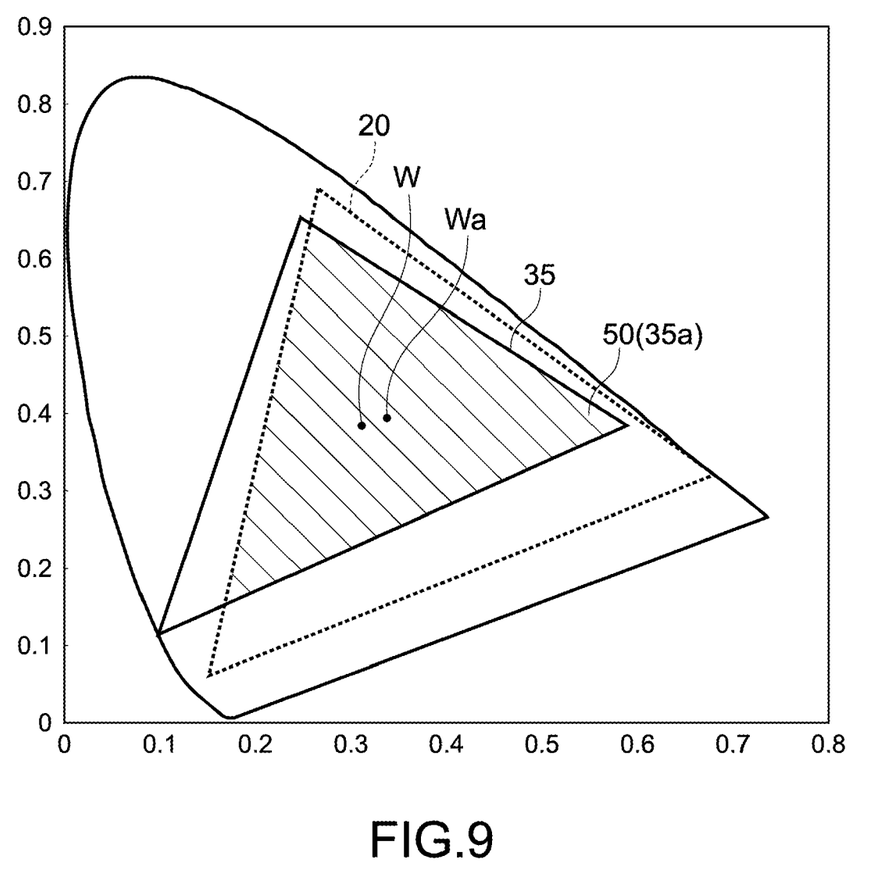
FIG. 9 is a diagram for explaining an embodiment of the setting of the second color gamut.

FIG. 9 is a diagram for explaining an embodiment related to the setting of the second color gamut. When chromaticity coordinates of red, green, and blue, which define the second color gamut 35, are designated, chromaticity coordinates may be selected in a range in the color gamut 20 of the liquid crystal panel 6, which is a color range that can be reproduced by the liquid crystal panel 6.

On the other hand, as shown in FIG. 9, as at least one chromaticity coordinates of red, green, and blue, chromaticity coordinates outside of the color gamut 20 of the liquid crystal panel 6 may be selected. Specifically, in a range over the color gamut 20 the liquid crystal panel 6, the second color gamut 35 may be set. Accordingly, it is possible to appropriately adjust the color of a displayed image. Hereinafter, this will be described.

When the first color gamut is converted into the second color gamut 35 by compression or extension, the vector from a white point W to each vertex of the triangle, which is located at a center of the set second color gamut 35, is an important element. In the second color gamut 35 shown in FIG. 9, an area 50 that overlaps with the color gamut 20 of the liquid crystal panel 6 is a range that can be expressed by colors. The assumption is made that the area 50 is set as a second color gamut 35a, for example. If the second color gamut 35 set beyond the color gamut 20 of the liquid crystal panel 6 is compared with the second color gamut 35a set within the color gamut 20 of the liquid crystal panel 6, vectors from the white point W (Wa) to the vertices are different from each other. Therefore, expressed colors are also different from each other. Specifically, by setting the second color gamut 35 not only in the color gamut 20 of the liquid crystal panel 6 but also in a range beyond the color gamut 20, it is possible to increase the size of the adjustment range of expressed colors. As a result, it is possible to express desired colors.

The assumption is made that color information outside of the color gamut 20 of the liquid crystal panel 6 is calculated in the conversion into the second color gamut 35. In this case, it becomes a saturation state, and a color on the outline of the color gamut 20 the liquid crystal panel 6 in a direction of a vector toward outside color information from the white point W is displayed, for example. Although it depends on the setting range of the second color gamut 35, an image is often not broken even if colors are expressed in this way. It should be noted that color information may be corrected appropriately from the outside of the color gamut 20 of the liquid crystal panel 6 into the color gamut 20 of the liquid crystal panel 6.

Moreover, in the case where the second color gamut 35 is set largely beyond the color gamut 20 of the liquid crystal panel 6, an image is displayed with extreme colors. However, such an image that is not a proper one may be displayed as it is so that tendency of color adjustment or tendency related to the setting of the second color gamut can be confirmed.

In the above, chromaticity coordinates at each vertex of the color gamut expressed by a triangle in the xy chromaticity diagram are selected appropriately. However, an embodiment of the present disclosure can be applied also to setting of a color gamut expressed by another color space such as a color gamut expressed by six colors, i.e., cyan, magenta, and yellow in addition to red, green, and blue, for example. By selecting coordinates of each color being a primary color appropriately, the second color gamut based on a user's instruction may be set.

In the above, as an embodiment of the present disclosure, the image display apparatus 100 exemplified in FIG. 1 or the like has been described. As another embodiment of the present disclosure, an apparatus that converts the first color information expressed by the first color gamut into the second color information expressed by the second color gamut based on a user's instruction and outputs it to an image display system, i.e., apparatus having the configuration up to the image display system may be used as an information processing apparatus according to an embodiment of the present disclosure. As the information processing apparatus according to an embodiment of the present disclosure, a computer such as a personal computer (PC) can be used, for example. In this case, it only needs to provide an output unit that outputs the second color information to the image display system.

It should be noted that the effects described in the present disclosure are by way of example only and not limited, and other effects may be produced thereby. At least two feature portions of the embodiments described above can be combined.

It should be noted that the present disclosure may also take the following structures.

(1) An information processing apparatus, including:
an acquisition unit configured to acquire image information including first color information that is represented by a first color gamut;
a first calculation unit configured to use information on a color gamut of an image display system that is capable of displaying an image based on the image information to calculate conversion information used for converting the first color information into second color information that is expressed by a second color gamut based on a user's instruction; and
a conversion unit configured to use the conversion information to convert the first color information into the second color information.

(2) The information processing apparatus according to (1) above, further including
an input unit configured to receive an instruction from the user, the second color gamut being set based on an instruction about chromaticity coordinates of red, green, and blue, which define the second color gamut in a CIE 1931 XYZ color space chromaticity diagram, the instruction being input to the input unit.

(3) The information processing apparatus according to (2) above, in which
the second color gamut is set based on an instruction that changes the chromaticity coordinates of red, green, and blue.

(4) The information processing apparatus according to (2) or (3) above, in which
the second color gamut is set based on an instruction that designates the chromaticity coordinates of red, green, and blue.

(5) The information processing apparatus according to any one of (1) to (4) above, further including:
a storage unit configured to store information on a color gamut for calculating the information on the color gamut of the image display system; and
a second calculation unit configured to use the stored information on a color gamut to calculate the information on the color gamut of the image display system, the first calculation unit being configured to use the calculated information on the color gamut of the image display system to calculate the conversion information.

(6) The information processing apparatus according to (5) above, in which
the storage unit is configured to store setting change information for converting the first color information into third color information that is expressed by a third color gamut serving as a color gamut set in advance, the setting change information being calculated using the information on the color gamut of the image display system in advance, and
the second calculation unit is configured to use the setting change information as information on the color gamut to calculate the information on the color gamut of the image display system.

(7) The information processing apparatus according to any one of (1) to (4) above, further including
a storage unit configured to store the information on the color gamut of the image display system, which is measured in advance, the first calculation unit being configured to use the stored information on the color gamut of the image display system to calculate the conversion information.

(8) The information processing apparatus according to any one of (2) to (4), in which
the second color gamut is set based on an instruction that selects chromaticity coordinates outside of the color gamut of the image display system as at least one of the chromaticity coordinates of red, green, and blue.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an acquisition unit configured to acquire image information including first color information that is represented by a first color gamut;
a first calculation unit configured to use information on a color gamut of an image display system that is capable of displaying an image based on the image information to calculate conversion information used for converting the first color information into second color information that is expressed by a second color gamut based on a user's instruction;
a conversion unit configured to use the conversion information to convert the first color information into the second color information;
a storage unit configured to store information on a color gamut for calculating the information on the color gamut of the image display system; and
a second calculation unit configured to use the stored information on a color gamut to calculate the information on the color gamut of the image display system, the first calculation unit being configured to use the calculated information on the color gamut of the image display system to calculate the conversion information, wherein the storage unit is configured to store setting change information for converting the first color information into third color information that is expressed by a third color gamut serving as a color gamut set in advance, the setting change information being calculated using the information on the color gamut of the image display system in advance, and the second calculation unit is configured to use the setting change information as information on the color gamut to calculate the information on the color gamut of the image display system.

2. The information processing apparatus according to claim 1, further comprising an input unit configured to receive an instruction from the user, the second color gamut being set based on an instruction about chromaticity coordinates of red, green, and blue, which define the second color gamut in a CIE 1931 XYZ color space chromaticity diagram, the instruction being input to the input unit.

3. The information processing apparatus according to claim 2, wherein the second color gamut is set based on an instruction that changes the chromaticity coordinates of red, green, and blue.

4. The information processing apparatus according to claim 2, wherein the second color gamut is set based on an instruction that designates the chromaticity coordinates of red, green, and blue.

5. The information processing apparatus according to claim 1, further comprising a storage unit configured to store the information on the color gamut of the image display system, which is measured in advance, the first calculation unit being configured to use the stored information on the color gamut of the image display system to calculate the conversion information.

6. An information processing apparatus, comprising:

an acquisition unit configured to acquire image information including first color information that is represented by a first color gamut;

a first calculation unit configured to use information on a color gamut of an image display system that is capable of displaying an image based on the image information to calculate conversion information used for converting the first color information into second color information that is expressed by a second color gamut based on a user's instruction;

a conversion unit configured to use the conversion information to convert the first color information into the second color information; and an input unit configured to receive an instruction from the user, the second color gamut being set based on an instruction about chromaticity coordinates of red, green, and blue, which define the second color gamut in a CIE 1931 XYZ color space chromaticity diagram, the instruction being input to the input unit, wherein the second color gamut is set based on an instruction that selects chromaticity coordinates outside of the color gamut of the image display system as at least one of the chromaticity coordinates of red, green, and blue.

7. An information processing method executed by a computer, comprising:

acquiring, by an acquisition unit, image information including first color information that is represented by a first color gamut;

using, by a first calculation unit, information on a color gamut of an image display system that is capable of displaying an image based on the image information to calculate conversion information used for converting the first color information into second color information that is expressed by a second color gamut based on a user's instruction;

using, by a conversion unit, the conversion information to convert the first color information into the second color information;

storing, by a storage unit, information on a color gamut for calculating the information on the color gamut of the image display system; and using, by a second calculation unit, the stored information on a color gamut to calculate the information on the color gamut of the image display system, the first calculation unit using the calculated information on the color gamut of the image display system to calculate the conversion information, wherein the storage unit stores setting change information for converting the first color information into third color information that is expressed by a third color gamut serving as a color gamut set in advance, the setting change information being calculated using the information on the color gamut of the image display system in advance, and the second calculation unit uses the setting change information as information on the color gamut to calculate the information on the color gamut of the image display system.

8. A computer-readable storage device encoded with computer-executable instructions that, when executed by a processing device, perform an information processing method comprising:

acquiring image information including first color information that is represented by a first color gamut;

using information on a color gamut of an image display system that is capable of displaying an image based on the image information to calculate conversion information used for converting the first color information into second color information that is expressed by a second color gamut based on a user's instruction;

using the conversion information to convert the first color information into the second color information;

storing information on a color gamut for calculating the information on the color gamut of the image display system; and using the stored information on a color gamut to calculate the information on the color gamut of the image display system, and using the calculated information on the color gamut of the image display system to calculate the conversion information, wherein storing information includes storing setting change information for converting the first color information into third color information that is expressed by a third color gamut serving as a color gamut set in advance, the setting change information being calculated using the information on the color gamut of the image display system in advance, and using the stored information includes using the setting change information as information on the color gamut to calculate the information on the color gamut of the image display system.

9. An image display apparatus, comprising:

an acquisition unit configured to acquire image information including first color information that is represented by a first color gamut;

an image display system that is capable of displaying an image based on the image information;

a first calculation unit configured to use information on a color gamut of the image display system to calculate conversion information used for converting the first color information into second color information that is expressed by a second color gamut based on a user's instruction;

a conversion unit configured to use the conversion information to convert the first color information into the second color information;

an output unit configured to output the second color information to the image display system;

a storage unit configured to store information on a color gamut for calculating the information on the color gamut of the image display system; and a second calculation unit configured to use the stored information on a color gamut to calculate the information on the color gamut of the image display system, the first calculation unit being configured to use the calculated information on the color gamut of the image display system to calculate the conversion information, wherein the storage unit is configured to store setting change information for converting the first color information into third color information that is expressed by a third color gamut serving as a color gamut set in advance, the setting change information being calculated using the information on the color gamut of the image display system in advance, and the second calculation unit is configured to use the setting change information as information on the color gamut to calculate the information on the color gamut of the image display system.

\* \* \* \* \*